(12) United States Patent  (10) Patent No.: US 8,675,954 B2
Nakayama et al.  (45) Date of Patent: Mar. 18, 2014

(54) IMAGE PROCESSING APPARATUS, IMAGE PROCESSING METHOD, AND COMPUTER PROGRAM PRODUCT FOR IMAGE PROCESSING

(75) Inventors: Io Nakayama, Tokyo (JP); Takeshi Mita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 125 days.

(21) Appl. No.: 13/355,187

(22) Filed: Jan. 20, 2012

(65) Prior Publication Data

US 2012/0314932 A1 Dec. 13, 2012

(30) Foreign Application Priority Data

Jun. 10, 2011 (JP) .................................. 2011-130293

(51) Int. Cl.
*G06K 9/00* (2006.01)
(52) U.S. Cl.
USPC .......................................................... 382/154
(58) Field of Classification Search
None
See application file for complete search history.

(56) References Cited

U.S. PATENT DOCUMENTS

2005/0129311 A1* 6/2005 Haynes et al. ................ 382/170
2006/0170769 A1* 8/2006 Zhou ............................ 348/143
2009/0116749 A1* 5/2009 Cristinacce et al. .......... 382/195
2009/0196510 A1* 8/2009 Gokturk et al. ............... 382/224
2011/0157160 A1* 6/2011 Ushiki et al. ................. 345/419

FOREIGN PATENT DOCUMENTS

JP 2001-209795 8/2001

OTHER PUBLICATIONS

Li, H. et al., "FaceSeg: Automatic Face Segmentation for Real-Time Video," IEEE Transactions on Multimedia, vol. 11, No. 1, pp. 77-88, (2009).
Rother, C. et al., "GrabCut-Interactive Foreground Extraction Using Iterated Graph Cuts," ACM Trans. Graphics (SIGGRAPH '04), vol. 23, No. 3, pp. 309-314, (2004).

\* cited by examiner

*Primary Examiner* — Stephen R Koziol
*Assistant Examiner* — Delomia Gilliard
(74) *Attorney, Agent, or Firm* — Finnegan, Henderson, Farabow, Garrett & Dunner, L.L.P.

(57) ABSTRACT

According to one embodiment, an image processing apparatus includes a first setting unit, a second setting unit, and a specifying unit. The first setting unit detects a position of at least a part of an object in an image so as to obtain, for one pixel or each of a plurality of pixels in the image, a first likelihood that indicates whether the corresponding pixel is included in a region where the object is present. The second setting unit obtains, for one pixel or each of a plurality of pixels in the image, a second likelihood indicating whether the pixel is a pixel corresponding to a 3D body by using a feature amount of the pixel. The a specifying unit specifies a region, in the image, where the object is present by using the first likelihood and the second likelihood.

8 Claims, 4 Drawing Sheets

IMAGE PROCESSING APPARATUS, IMAGE PROCESSING METHOD, AND COMPUTER PROGRAM PRODUCT FOR IMAGE PROCESSING

CROSS-REFERENCE TO RELATED APPLICATION

This application is based upon and claims the benefit of priority from Japanese Patent Application No. 2011-130293, filed on Jun. 10, 2011; the entire contents of which are incorporated herein by reference.

FIELD

Embodiments described herein relate generally to an image processing apparatus, an image processing method, and a program for image processing.

BACKGROUND

There has been an image processing method for specifying an object region (e.g., a human region) in an input image. The image processing method described above is called an "image segmentation technique" and the like.

Conventional image processing methods include a method in which a color model of a human is generated from each pixel in a face region specified by a face recognition, and the color model and each pixel in the face region are compared to specify a human region.

However, when a region of a total individual is to be specified in the image processing method described above, the region of the total individual cannot precisely be specified.

In another conventional image processing method, a human model that is learned in advance is applied to a face region of a human so as to specify a human region in an input image. However, the image processing method described above has a problem that the human region cannot precisely be specified, when an actual human shape in the input image is different from the shape of the learned human model.

DETAILED DESCRIPTION

In general, according to one embodiment, an image processing apparatus includes a first setting unit, a second setting unit, and a specifying unit. The first setting unit detects a position of at least a part of an object in an image so as to obtain, for one pixel or each of a plurality of pixels in the image, a first likelihood that indicates whether the corresponding pixel is included in a region where the object is present. The second setting unit obtains, for one pixel or each of a plurality of pixels in the image, a second likelihood indicating whether the pixel is a pixel corresponding to a 3D body by using a feature amount of the pixel. The specifying unit specifies a region, in the image, where the object is present by using the first likelihood and the second likelihood.

First Embodiment

An image processing apparatus 1 according to a first embodiment may be used for a TV, PC, digital photo frame, and the like, for example. The image processing apparatus 1 may also be used for a TV, PC, and digital photo frame that allow a user to perceive a 3D (three-dimensional) image. The image processing apparatus 1 specifies one or plural object regions in an input image. The present embodiment describes the case where the object is a human.

When the image processing apparatus 1 is used for a 3D TV or 3D PC that can allow a user to perceive a 3D image with naked eyes or with the use of special glasses, the image processing apparatus 1 may allocate a depth, which represents a degree of a depth of each pixel in an input image based upon the specified human region, thereby generating a 3D image.

The image processing apparatus 1 detects a position of a face region 103 (a part of the human region) in the input image, and acquires a likelihood (first likelihood), for one pixel or each of plural pixels in the input image, indicating whether the corresponding pixel is contained in the human region or not. The image processing apparatus 1 acquires, for one pixel or each of plural pixels in the input image, a likelihood (second likelihood) indicating whether or not each pixel is a pixel corresponding to a 3D body by using a feature amount (described later) of the corresponding pixel. In the present embodiment, the 3D body means a region other than the background in the input image, and it includes an object (human). The image processing apparatus 1 specifies the human region in the input image by using the first likelihood and the second likelihood.

Figure 1:
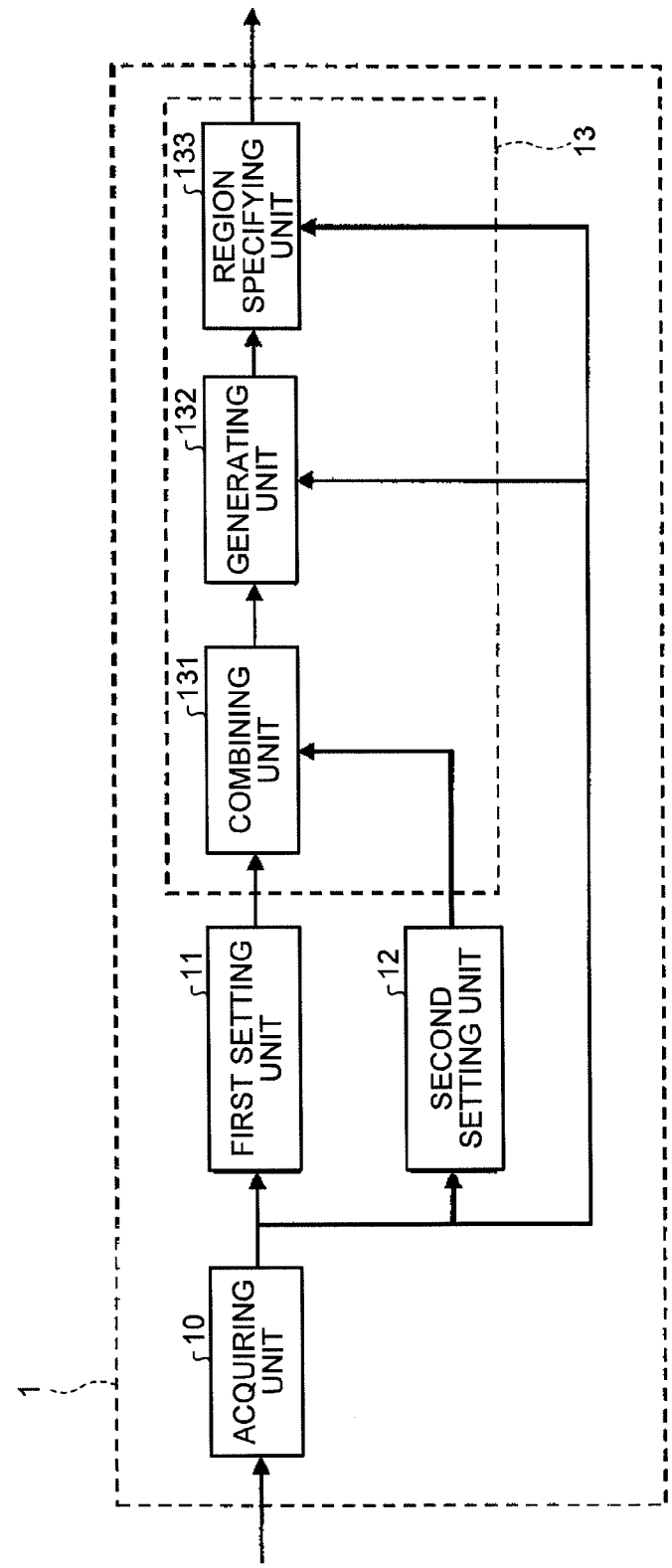
FIG. 1 is a block diagram illustrating an image processing apparatus 1 according to a fist embodiment.

FIG. 1 is a block diagram illustrating the image processing apparatus 1. The image processing apparatus 1 includes an acquiring unit 10, a first setting unit 11, a second setting unit 12, and a specifying unit 13. The specifying unit 13 includes a combining unit 131, a generating unit 132, and a region specifying unit 133.

The acquiring unit 10 acquires an input image.

The first setting unit 11 detects a position of a face region 103 in the input image, and allocates a first model of a human that is prepared in advance correspondingly to the detected position of the face region 103, thereby acquiring the first likelihood. In this case, the first setting unit 11 may extract the first model from a storage unit (not illustrated) that stores the first model. The first likelihood indicates that, the higher the value is, the higher the probability that it is the human region becomes. Specifically, the first likelihood of each pixel in the first model allocated to the input image is higher than the first likelihood of each pixel outside the first model. For example, the first likelihood of each pixel in the first model may be "1", and the first likelihood of each pixel outside the first model may be "0".

The second setting unit 12 acquires the second likelihood of the corresponding pixel based upon a feature amount of one pixel or each of plural pixels in the input image. The feature amount of each pixel means a parameter of each pixel (or pixel group), such as a pixel value (for each color component) or brightness of each pixel, and texture information (including a brightness gradient with the adjacent pixel) of each pixel. The feature amount of the plural pixels may be a mean value of the feature amounts of the respective pixels. For one or each of plural pixels in the input image, the second setting unit 12 may calculate the second likelihood of the corresponding pixel according to the pixel value of the corresponding pixel or the pixel value of a surrounding pixel of the corresponding pixel.

The combining unit 131 combines the first likelihood and the second likelihood based upon a predetermined rule so as to acquire a third likelihood for each pixel.

The generating unit 132 generates a second model of a human based upon the feature amount for one or plural pixels in the input image and the third likelihood for each pixel. The second model is a model used for determining whether or not each pixel in the input image is contained in the human region.

The region specifying unit 133 compares the feature amount of one or plural pixels in the input image and the second model, thereby specifying the human region in the input image.

The acquiring unit 10, the first setting unit 11, the second setting unit 12, and the specifying unit 13 can be realized by a central processing unit (CPU) and a memory used in the CPU.

The above is the configuration of the image processing apparatus 1.

Figure 2:
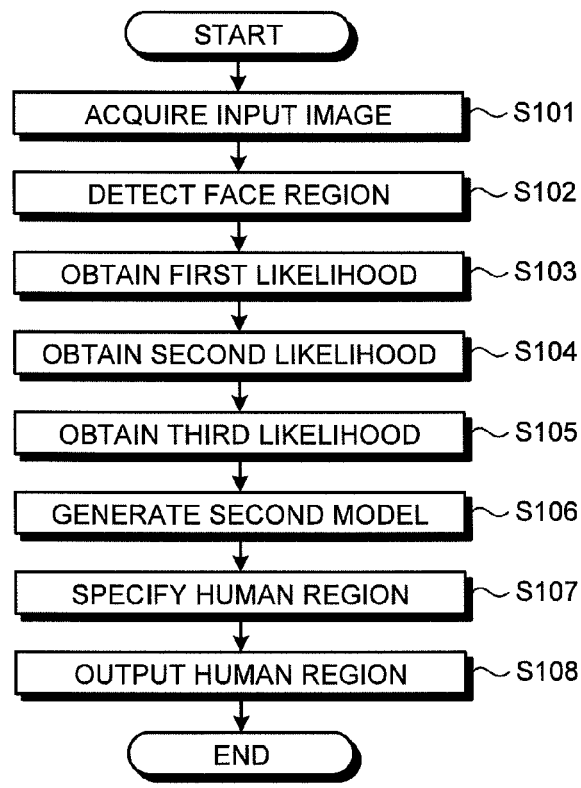
FIG. 2 is a flowchart illustrating a process of the image processing apparatus 1.
Figure 3:
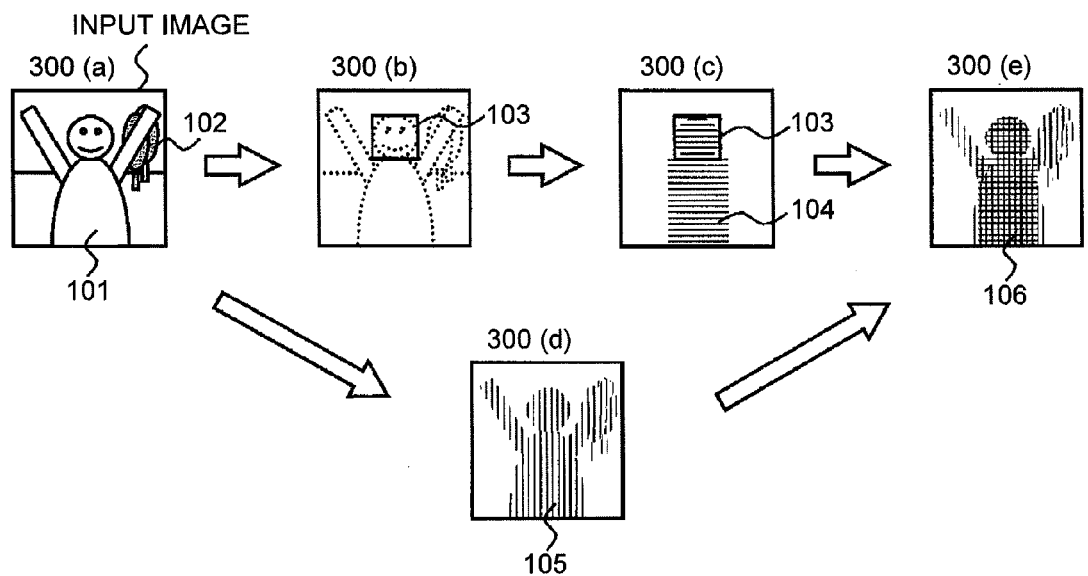
FIG. 3 is a schematic view illustrating the process of the image processing apparatus 1.

FIG. 2 is a flowchart illustrating process of the image processing apparatus 1. FIG. 3 is a schematic view illustrating the process of the image processing apparatus 1.

The acquiring unit 10 acquires the input image (S101). As illustrated procedure 300 (a) in FIG. 3, it is supposed that the input image includes one human 101, and a 3D body 102 other than the human 101. The acquiring unit 10 acquires the input image, and provides the same to the first setting unit 11, the second setting unit 12, the generating unit 132, and the region specifying unit 133.

The first setting unit 11 detects the position of the face region 103 in the input image (S102). As illustrated procedure 300 (b) in FIG. 3, the first setting unit 11 may obtain a feature such as Harr-like, which is a luminance difference (brightness difference may be applied) with the proximate rectangular region, thereby recognizing a position of the face region 103. However, the present invention is not limited thereto, and known face recognition processes may be employed.

The first setting unit 11 applies the first model to the detected face region, thereby obtaining the first likelihood (S103). Procedure 300 (c) in FIG. 3 illustrates that pixels encircled by a black line have higher likelihood (first likelihood) indicating that these pixels are contained in the human region than the pixels outside the black line. The first setting unit 11 obtains a first likelihood 104 as illustrated in Procedure 300 (c). The first setting unit 11 provides the obtained first likelihood to the combining unit 131.

When the input image includes plural humans, the first setting unit 11 may obtain the first likelihood for each pixel in the input image based upon the position of each face region.

It is desirable that the first model used for obtaining the first likelihood has set thereto a reference position corresponding to the detected position of the face region 103. The size of the first model does not have to be equal to the size of the face region. Specifically, the first setting unit 11 may enlarge or reduce largeness of the first model according to the size of the face region. In procedure 300 (c), the width of the first model is enlarged or reduced so that the width of the first model agrees with the width of the face region.

The second setting unit 12 obtains the second likelihood of the corresponding pixel based upon the feature amount of one or plural pixels in the input image (S104). In procedure 300 (d), the pixels included in black lines 105 have higher likelihood (second likelihood) indicating that these pixels are contained in a 3D body region, than the pixels outside the black lines.

For example, the second setting unit 12 may calculate the second likelihood for each pixel by using an identifier that detects a 3D body. Alternatively, the second setting unit 12 may detect a "sky region" and a "ground region" in the input image so as to calculate the second likelihood based upon these regions. The second setting unit 12 provides the obtained second likelihood to the combining unit 131.

The combining unit 131 combines the first likelihood and the second likelihood to obtain the third likelihood (S105). As illustrated in procedure 300 (e), the combining unit 131 combines the first likelihood and the second likelihood for each pixel, thereby obtaining a third likelihood 106.

For example, the combining unit 131 may calculate a product of the first likelihood and the second likelihood corresponding to the same pixel in the input image so as to obtain the third likelihood for each pixel. Alternatively, the combining unit 131 may employ higher one of the first likelihood and the second likelihood corresponding to the same pixel in the input image, thereby obtaining the third likelihood for each pixel. In this case, it is desirable that the first likelihood and the second likelihood are normalized.

The present invention is not limited to the above-mentioned description. The third likelihood may be obtained by combining the first likelihood and the second likelihood according to predetermined rules.

The generating unit 132 generates the second model based upon the feature amount for one pixel or each of plural pixels in the input image and the third likelihood for each pixel (S106).

For example, the generating unit 132 may generate the second model that is weighted with the feature amount of each pixel in order that the weight of the feature amount of the pixel having high third likelihood is high. In a case where the second model is weighted mean, the second model M is represented by an equation 1, wherein the number of pixels is defined as N, the feature amount of a pixel z is defined as v(z), and the third likelihood is defined as w(z).

$$M = \frac{\sum_{z=1}^{N} w(z)v(z)}{\sum_{z=1}^{N} w(z)} \quad (1)$$

The second model is not limited thereto. For example, a known model that can weight data, such as "Gaussian Mixture Model" for a color, may be employed for the second model.

The generating unit 132 may not directly obtain the second model, but may generate a background model that is a model of a region (hereinafter referred to as background region) other than a human in the input image. The background model may be generated with the use of the likelihood that is opposite to the third likelihood used for the second model.

The region specifying unit 133 compares the feature amount of the corresponding pixel and the generated second model, for one pixel or each of plural pixels in the input image, thereby specifying the human region in the input image (S107).

The region specifying unit 133 may specify the human region in the input image with the technique described in the following Non-Patent Document. In this case, the region specifying unit 133 determines the likelihood A indicating that the corresponding pixel is included in the human region from the similarity between the feature amount of each pixel in the input image and the second model. The region specifying unit 133 determines the likelihood B indicating that the corresponding pixel is included in the background region from the similarity with the background model. The region specifying unit 133 specifies the human region in the input image based upon the likelihood A and the likelihood B (the Non-Patent Document: Carsten Rother, Vladimir Kolmogorov, Andrew Blake, GrabCut "—Interactive Foreground Extraction using Iterated Graph Cuts", ACM Trans. Graphics (SIGGRAPH '04), vol. 23, no. 3, pp. 309-314, 2004).

Any other known technique may be employed, so long as the region specifying unit 133 specifies the human region by using the second model.

The region specifying unit 133 outputs the data of the specified human region (S108). For example, the region specifying unit 133 may output the data of the human region to a 3D image generating unit (not illustrated). The 3D image generating unit (not illustrated) allocates a depth to each pixel of the input image based upon the data of the specified human region, thereby generating a 3D image. Thus, the process of the image processing apparatus 1 to the input image is completed.

The process of the image processing apparatus 1 is described above.

In the present embodiment, the first setting unit 11 allocates the first model, which is prepared in advance, to the input image so as to obtain the first likelihood. However, the present invention is not limited thereto. For example, the first setting unit 11 may obtain the first likelihood of each pixel according to the distance from the position of the detected face region to each pixel. In this case, the first setting unit 11 may set the first likelihood to be lower for the pixel according to the distance from the position of the face region 103 is larger.

Alternatively, the first setting unit 11 may set a rectangle region at the position of the detected face region, and may set the first likelihood of the pixel contained in the rectangle to be high. The first setting unit 11 may obtain the first likelihood according to a function defined in advance.

The first setting unit 11 may identify an attribute (age, sex, race, etc.) of a human in the input image based upon the detected face with the use of a known method, thereby obtaining the first likelihood corresponding to the identified attribute. In this case, the first setting unit 11 may store the first likelihood corresponding to each attribute in a storage unit (not illustrated).

When the input image is an infrared image, the second setting unit 12 may detect a region of each pixel having a temperature (e.g., 35 to 40 degrees Celsius) close to a mean body temperature of a human, and may calculate the second likelihood based upon the difference between each pixel and the mean body temperature in this region.

The first setting unit can precisely detect a part (face or body of a human) of an object, but it is difficult to detect a unique posture of the object, such as a region of a lifted arm. On the other hand, the second setting unit 12 can precisely detect the region of the unique posture of the object.

According to the present embodiment, even if the object in the input image is different from the shape that is expected in advance, the object region can precisely be specified. An automatic process performed to the object region, such as a trimming of an object, or a fresh tone correction in the human region, can effectively be realized by using the specified object region.

First Modification

The image processing apparatus 1 can specify not only a human region but also a region of another object (e.g., animal, vehicle, building, vegetation, etc.). Specifically, a first model corresponding to the object described above may be stored in the storage unit (not illustrated), and the first setting unit 11 may identify the corresponding object from some of the detected objects, and extract the first model corresponding to the object from the storage unit (not illustrated), thereby obtaining the first likelihood.

For example, when the object is an automobile, the first setting unit 11 may detect a position of an automobile region in the input image, and extract a first model from the storage unit (not illustrated), storing the first model of a automobile in advance, for one pixel or each of plural pixels in the input image, thereby obtaining the first likelihood.

Second Modification

When the image processing apparatus 1 includes a 3D image generating unit (not illustrated) in order to generate a 3D image from the input image, the image processing apparatus 1 may further include an adjusting unit (not illustrated). The adjusting unit (not illustrated) may receive an instruction of an image quality of a 3D image to be generated, and adjusts the size of the input image used for generating the second model by the generating unit 132.

For example, when high image quality is designated, the adjusting unit (not illustrated) does not reduce the size of the input image used for generating of the second model by the generating unit 132, while if low quality is designated, it reduces the size of the input image used for generating of the second model by the generating unit 132. The generating unit 132 generates the second model based upon the feature amount of each pixel and the third likelihood in the input image having the designated size.

The adjusting unit (not illustrated) may reduce the size of the input image by using a pixel value of one of pixels included in each block of the input image. Alternatively, it may reduce the size of the input image by using a mean value of pixel values of the pixels included in each block of the input image. The size of the input image may be reduced by using not only the techniques described above but also known ones such as a weighted mean filter or a median filter.

The adjusting unit (not illustrated) may display an UI screen, which accepts the designation of the image quality, on a display screen (not illustrated) on which a 3D image is to be displayed. A user may designate image quality by using a remote controller or the like. The higher the image quality is set, the longer the processing time, taken for generating the 3D image by the image processing apparatus 1, becomes. The lower the image quality is set, the shorter the processing time becomes.

The UI screen may be a designation screen for a user to designate any one of image quality modes of "high, middle, low". In this case, the user may select one of the image quality modes from the designation screen for designation.

For example, when the image quality designated by the user is "high", the adjusting unit (not illustrated) does not reduce the size of the input image used for generating of the second model by the generating unit 132, while if the image quality designated by the user is "low", it reduces the size of the input image to 25% of its original size.

The UI screen may include a bar that can designate one of numerical values (e.g., 0 to 100) within a certain range. In this case, the user may designate one of the numerical values so as to designate image quality.

When the image quality designated by the user is "100", for example, the adjusting unit (not illustrated) does not reduce the input image used for the generation of the second model by the generating unit 132, while if the image quality designated by the user is "50", it may reduce the length and width of the input image to 50% of the original sizes respectively. When the image quality designated by the user is "25", for example, the adjusting unit (not illustrated) reduces the length and width of the input image to 25% of the original sizes respectively.

The image processing apparatus 1 according to the present modification can adjust the precision of the second model to be generated according to the designation of the image quality by the user, whereby the precision of the 3D image to be generated can be adjusted. Specifically, the user can selectively designate the image quality considering the processing time.

When the image processing apparatus 1 is used for a 3D TV, the present modification can be employed for generating a 3D image from a recorded moving image (input image) by the 3D TV.

When the image processing apparatus 1 is used for a 3D PC, the present modification can be employed for generating a 3D image from an input image (still image such as a photograph, or moving image) by the 3D PC.

Second Embodiment

An image processing apparatus 2 according to a second embodiment is different from the first embodiment in that the specified human region is corrected by using the first likelihood and the second likelihood.

Figure 4:
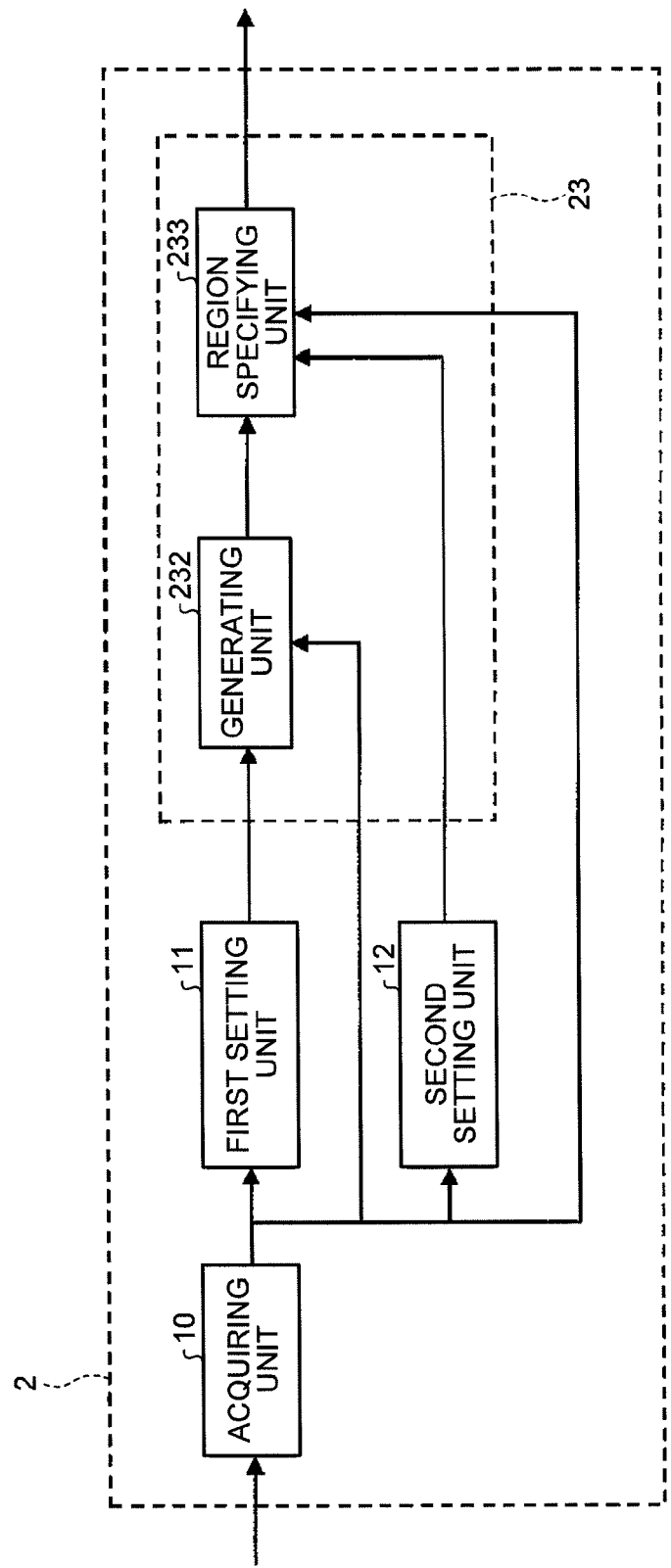
FIG. 4 is a block diagram illustrating an image processing apparatus 2 according to a second embodiment.

FIG. 4 is a block diagram illustrating the image processing apparatus 2. The image processing apparatus 2 includes a specifying unit 23 instead of the specifying unit 13 in the image processing apparatus 1. The specifying unit 23 includes a generating unit 232, and a region specifying unit 233.

Figure 5:
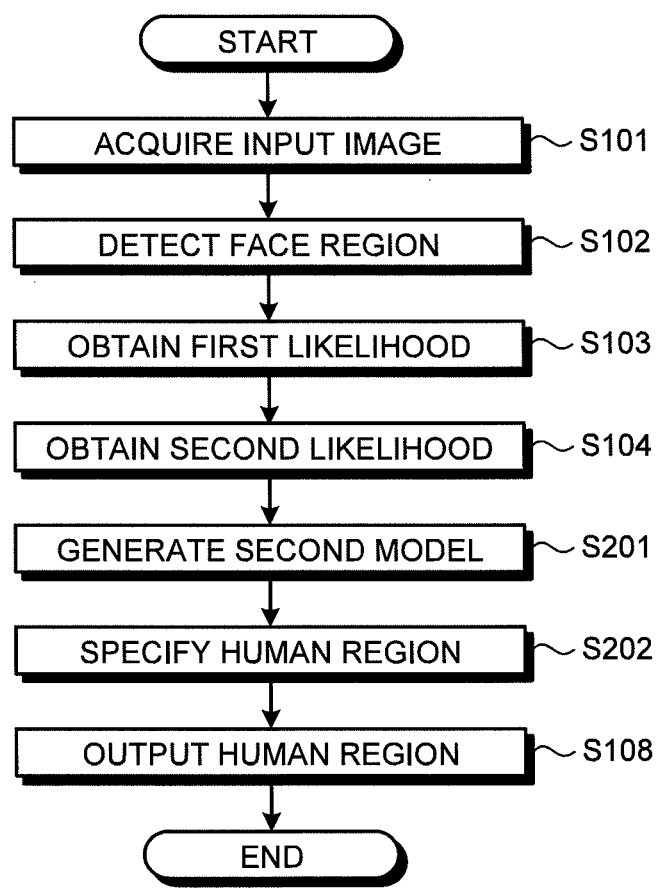
FIG. 5 is a flowchart illustrating a process of the image processing apparatus 2.

FIG. 5 is a flowchart illustrating process of the image processing apparatus 2. In the process in the image processing apparatus 2, the process in step S105 in FIG. 2 is not operated. Step S106 in FIG. 2 is replaced by step S201. Step S107 in FIG. 2 is replaced by step S202.

In step S201, the generating unit 232 generates the second model by using the first likelihood (S201). The generating unit 232 may generate the second model by the same manner as in the case where the generating unit 132 generates the second model by using the third likelihood in the first embodiment.

In step S202, the region specifying unit 233 employs the first likelihood and the second likelihood in addition to the second model. The region specifying unit 233 corrects the specified human region by using the first likelihood and the second likelihood. For example, the region specifying unit 233 multiplies the likelihood, which indicates the human region likeliness of each pixel calculated from the comparison between the feature amounts of one or plural pixels in the input image and the second model, by the first likelihood and the second likelihood, thereby correcting the specified human region. The region specifying unit 233 may correct the likelihood indicating the background region by using the likelihood opposite to the first likelihood and the likelihood opposite to the second likelihood.

The above description relates to the difference between the process of the image processing apparatus 2 and the process of the image processing apparatus 1.

As described above, the first likelihood and the second likelihood can directly be used for specifying the object region according to the second image processing apparatus 2. Thus, when the precision of the first likelihood and the second likelihood is high, the object region can be specified more precisely than in the first embodiment.

In the present embodiment, the first modification and the second modification in the first embodiment can also be applied.

According to the embodiments described above, the object region in the image can precisely be specified.

The object region specifying apparatus described above can be realized by the configuration in which a general-purpose computer is used as a basic hardware. Specifically, A, B, C, and D can be realized by allowing a processor that is mounted on the above-mentioned computer to execute a program. In this case, the object region specifying apparatus may realize these by installing the program in advance to the computer. Alternatively, it may realize these by a process in which the program is stored in a storage medium such as a CD-ROM, or the program is distributed through a network, and this program is appropriately installed to the computer. The B and C can be realized by appropriately utilizing a memory that is internally or externally mounted to the computer, a hard disk, or a storage medium such as CD-R, CD-RW, DVD-RAM, or DVD-R.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a processor configured to:
detect a position of at least a part of an object in an image so as to obtain, for one pixel or each of a plurality of pixels in the image, a first likelihood that indicates whether the pixel is included in a region where the object is present;
obtain, for one pixel or each of a plurality of pixels in the image, a second likelihood indicating whether the pixel is a pixel corresponding to a 3D body by using a feature amount of the pixel;
hold in advance a first model indicating the region where the object is present;
allocate the first model correspondingly to the detected position of a part of the object, thereby obtaining the first likelihood;
combine the first likelihood and the second likelihood so as to obtain a third likelihood for one pixel or each of a plurality of pixels in the image;
generate a second model to determine whether or not the pixel of the image is included in the region where the object is present, by using the third likelihood; and
determine whether or not the pixel of the image is included in the region where the object is present by using the second model, thereby specifying the region where the object is present.

2. The apparatus according to claim 1, wherein
the object is a human, and
the processor is further configured to detect the position of a face of the human in the image.

3. The apparatus according to claim 1,
the processor further configured to obtain the third likelihood from a product of the first likelihood and the second likelihood.

4. The apparatus according to claim 1, the processor further configured to:
allocate a depth, which indicates a degree of a depth of each of the pixels in the image, based upon the specified object region, so as to generate a 3D image that a user can view stereoscopically.

5. The apparatus according to claim 1, the processor further configured to:
adjust a size of the image, the size being used for generating the second model by the generating unit.

6. An image processing method comprising:
detecting a position of at least a part of an object in an image so as to obtain, for one pixel or each of a plurality of pixels in the image, a first likelihood, which indicates whether the pixel is included in a region where the object is present;
obtaining, for one pixel or each of a plurality of pixels in the image, a second likelihood indicating whether the pixel is a pixel corresponding to a 3D body by using a feature amount of the pixel;
holding in advance a first model indicating the region where the object is present;
allocating the first model correspondingly to the detected position of a part of the object, thereby obtaining the first likelihood;
combining the first likelihood and the second likelihood so as to obtain a third likelihood for one pixel or each of a plurality of pixels in the image;
generating a second model to determine whether or not the pixel of the image is included in the region where the object is present, by using the third likelihood; and
determining whether or not the pixel of the image is included in the region where the object is present by using the second model, thereby specifying the region where the object is present.

7. A computer program product having a non-transitory computer readable medium including programmed instructions, wherein the instructions, when executed by a computer, cause the computer to perform:
detecting a position of at least a part of an object in an image so as to obtain, for one pixel or each of a plurality of pixels in the image, a first likelihood, which indicates whether the pixel is included in a region where the object is present;
obtaining, for one pixel or each of a plurality of pixels in the image, a second likelihood indicating whether the pixel is a pixel corresponding to a 3D body by using a feature amount of the pixel;
holding in advance a first model indicating the region where the object is present;
allocating the first model correspondingly to the detected position of a part of the object, thereby obtaining the first likelihood;
combining the first likelihood and the second likelihood so as to obtain a third likelihood for one pixel or each of a plurality of pixels in the image;
generating a second model to determine whether or not the pixel of the image is included in the region where the object is present, by using the third likelihood; and
determining whether or not the pixel of the image is included in the region where the object is present by using the second model, thereby specifying the region where the object is present.

8. An image processing apparatus comprising:
a processor configured to:
detect a position of at least a part of an object in an image so as to obtain, for one pixel or each of a plurality of pixels in the image, a first likelihood that indicates whether the pixel is included in a region where the object is present;
obtain, for one pixel or each of a plurality of pixels in the image, a second likelihood indicating whether the pixel is a pixel corresponding to a 3D body by using a feature amount of the pixel;
specify a region, in the image, where the object is present by using the first likelihood and the second likelihood;
generate a model used for determining whether or not the pixel in the image is included in a region where the object is present, by using at least one of the first likelihood and the second likelihood; and
determine whether or not the pixel of the image is included in the region where the object is present, by using at least one of the first likelihood, the second likelihood, and the model, thereby specifying the region where the object is present.

* * * * *